United States Patent [19]

Kiyanagi et al.

[11] 3,852,266
[45] Dec. 3, 1974

[54] PROCESS FOR PRODUCING 5-IODO-DEOXY-URIDINE

[75] Inventors: Tetsuo Kiyanagi; Morio Suzuki; Hiroshi Yoshino, all of Choshi, Japan

[73] Assignee: Yamasa Shoyu Kabushiki Kaisha, Chiba-ken, Japan

[22] Filed: Dec. 22, 1971

[21] Appl. No.: 211,098

[30] Foreign Application Priority Data
Dec. 24, 1970 Japan .............................. 45-116709

[52] U.S. Cl. ........................................ 260/211.5 R
[51] Int. Cl. ............................................ C07d 51/52
[58] Field of Search ............................. 260/211.5 R

[56] References Cited
UNITED STATES PATENTS
3,155,646  11/1964  Hunter .......................... 260/211.5 R
3,651,044   3/1972  Hunter .......................... 260/211.5 R

OTHER PUBLICATIONS

Chang et al., Biochemistry Pharmacology, Vol. 8, 11, 1961, pp. 327 & 328.

Primary Examiner—Johnnie R. Brown
Attorney, Agent, or Firm—Wenderoth, Lind & Ponack

[57] ABSTRACT

Process for preparing 5-iodo-deoxy-uridine by treating 2'-deoxy-uridine with iodine and a cation exchange resin.

5 Claims, No Drawings

PROCESS FOR PRODUCING 5-IODO-DEOXY-URIDINE

This invention is concerned with improvement in the process for production of 5-iodo-deoxy-uridine (hereinafter referred to as "IDU") which has a structural formula as shown in the following.

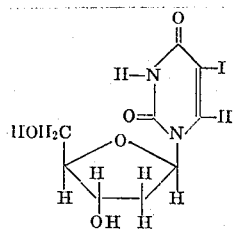

More particularly, it relates to production of 5-iodo-deoxy-uridine by the following process steps: 2'-deoxy-uridine in acid or in water is uniformly mixed with a water-soluble organic solvent containing therein iodine; then a cation-exchange resin is added to the mixture, thereafter the whole batch is heated in hot water bath at a temperature range of from 85°C to 100°C for 30 minutes under a reflux condenser; and upon completion of heating, the resin is separated from the solution by filtration and the filtered solution is evaporated in vacuo to crystallize the IDU.

Preparation of IDU has already been described in "Biochimica et Biophysica Acta," Vol. 32, page 295 (1959). According to this known art, IDU is obtainable by iodizing 2'-deoxy-uridine with iodine by use of chloroform containing therein 1 normal nitric acid or 3 normal caustic soda as a solvent. In either case, however, the rate of yield of the intended product can not exceed 56% which is not favorable for industrialized production of IDU.

There has also been known another method of producing IDU, according to which 2'-deoxy-uridine is iodized by either halogenated iodine or a complex salt of iodine monochloride and ammonium chloride or alkali chloride, which is represented by a general formula of: MCl.ICl (where M denotes ammonium group or alkali metal), in hydrochloric acid or aliphatic low class alcohol heated to a temperature of 80°C. This method is better than the abovementioned method in respect of the rate of yield, but it is still as low as 83 to 84%.

It is therefore the primary object of the present invention to provide an improved method of producing IDU at a higher rate of yield.

According to the present invention, there is provided a process for preparation of 5-iodo-deoxy-uridine which comprises reacting the acidic solution of 2'-deoxy-uridine in a water soluble organic solvent containing iodine with a cation-exchange-resins under heating.

The details of the present invention will be described hereinbelow with reference to preferred examples thereof.

The present inventors have conducted repeated experiments and studies for a simplified process step to obtain IDU at a higher rate of yield than that by the known methods, as the result of which they have found that, when 2'-deoxy-uridine is dissolved in acid or water, then an iodine solution prepared by dissolving the same in an organic solvent is added to the 2'-deoxy-uridine solution and agitated, and subsequently a cation exchange resin is added to the mixture solution and heated, while agitating the same, 2'-deoxy-uridine is completely iodized and the required IDU can be obtained at a remarkable rate of yield of as high as 93 to 95%.

The acid to be used for dissolving 2'-deoxy-uridine in the first step may be any inorganic strong acid having a pH value of less than 2 (or 0.01 to 2 normal) in solution. Example of most commonly used inorganic acid for the purpose of the present invention is: nitric acid, sulfuric acid, and hydrochloric acid.

The organic solvents to be used for dissolving iodine in the abovementioned second step may be any one of the following: alcohols, dioxane, chloroform, etc., the concentration of which ranges from 20 to 80%.

The strong acidic cation exchange resins to be used in the third step are limited to those having $-SO_3H$ or $-COOH$ as the exchange group. They are: Diaion KBK, Diaion SK 1, Diaion SK 102, Diaion SK 1A, Diaion SK 110, Diaion PK 204 to PK 228, Zeollex SA, Amberlite IR 112, Amberlite 120, Amberlite IR 122, Dawex 30, Dawex 50, Dawex 50×1, Dawex 50×26, Nalcite HCR, Nalcite HPR, Permutite Q, Permutite QX, Duolite C-1, Duolite-3, Duolite C-10, Duolite C-20, Duolite C-25, Duolite C-26, and so forth.

The relative amount of iodine to be mixed with 2'-deoxy-uridine is preferably more than twice as much as the mol ratio of 2'-deoxy-uridine. Also, the relative amount of the cation exchange resin with respect to 2'-deoxy-uridine should preferably be an equivalent amount to that of 2'-deoxy-uridine. Further, the relative amount of the cation exchange resin with respect to the mixture solution of 2'-deoxy-uridine and iodine is from 1 to 5% by weight per the mixture solution.

The reaction mechanism of the cation exchange resin and 2'-deoxy-uridine has yet to be clarified, but, from the researches made so far, it can be inferred that a factor constituting double reaction caused in the reaction system is adsorbed to the cation exchange resin.

The IDU thus obtained possesses excellent anti-virus action, hence it can be used as an efficacious medicine for treatment of corneitis, etc. caused by "herpes corneae simplex" virus.

In order to enable skilled persons in the art to reduce the present invention into practice, the following preferred examples are given. It should, however, be noted that the invention is not limited to these embodiments alone, but any change may be made within the ambit of the present invention as afforded by the appended claims.

EXAMPLE 1

1 Gr of 2'-deoxy-uridine was dissolved in 10 ml of 0.5 N-nitric acid ($HNO_3$), to which 50 ml of dioxane solution containing therein 2.25 gr of iodine ($I_2$) was added, and sufficiently agitated. Then, 2.5 ml of Diaion PK 216 (cation exchange resin) was added to the mixture solution, and the whole batch was reacted for 30 minutes in a bath of boiling water, while agitating. Upon completion of the reaction under heat, the cation exchange resin was removed from the solution by filtration, and the filtrate was evaporated in vacuo to crystallize the IDU. As the result, 1.49 gr of IDU was produced at a rate of yield of 95%.

EXAMPLE 2

1 Gr of 2'-deoxy-uridine was dissolved in 10 ml of 0.5 N-nitric acid ($HNO_3$), to which 50 ml of chloroform solution containing therein 2.25 gr of iodine ($I_2$) was added and sufficiently agitated. Subsequently, 2.5 ml of Amberlite IR 120 was added to the mixture solution, and the whole batch was reacted for 30 minutes in a bath of boiling water, while agitating. After heating, the reacted solution was treated and refined in the same manner as in Example 1 above, whereby 1.46 gr of the IDU was obtained at a rate of yield of 93%.

EXAMPLE 3

1 Gr of 2'-deoxy-uridine was dissolved in 10 ml of 0.5 N-nitric acid ($HNO_3$), to which 50 ml of ethanol solution containing therein 2.25 gr of iodine ($I_2$) was added and sufficiently agitated. Thereafter, 2.5 ml of Dawex 30 added to the mixture solution, and the whole batch was reacted for 30 minutes in a hot water bath at 85°C, while agitating. After the heating reaction, the reacted solution was treated and refined in the same manner as in Example 1 above, whereby 1.51 gr of the IDU was obtained at a rate of yield of 96%.

EXAMPLE 4

1 Gr of 2'-deoxy-uridine was dissolved in 10 ml of 0.5 N-nitric acid ($HNO_3$), to which 50 ml of methanol solution containing therein 2.25 gr of iodine ($I_2$) was added and sufficiently agitated. Thereafter, 2.5 ml of Duolite C-20 was added to the mixture solution, and the whole batch was reacted for 30 minutes in a hot water bath at 90°C, while agitating. Upon completion of the reaction, the reacted solution was treated and refined in the same manner as in Example 1 above, thereby obtaining 1.48 gr of the IDU at a rate of yield of 94%.

We claim:

1. A process for producing 5-iodo-deoxy-uridine which consists essentially of admixing a solution of 2'-deoxy-uridine in water or a mineral acid selected from the group consisting of nitric acid, sulfuric acid and hydrochloric acid with a solution of iodine in a water soluble organic solvent, heating the resultant mixture at a temperature of from 85° to 110°C in the presence of a strong acidic cation exchange resin in an amount of from 1 to 5% by weight, based on the weight of said mixture, while agitating said mixture, thereby iodizing said 2'-deoxy-uridine.

2. The process as claimed in claim 1, wherein said water soluble organic solvent is selected from the group consisting of alcohols, dioxane, and chloroform.

3. The process as claimed in claim 1, wherein said cation exchange resin is selected from the group consisting of Diaion SK 1, Diaion SK 102, Diaion SK 1A, Diaion SK 110, Diaion PK 204 to PK 228, Zeollex-SA, Amberlite IR 112, Amberlite IR 120, Amberlite IR 122, Dawex 50, Dawex 50×1, Nalcite HCR, Nalcite HPR, Permutite Q, Permutite QX, Duolite C-3, Duolite C-10, Duolite C-20, Duolite C-25, and Duolite C-26.

4. The process as claimed in claim 1, in which 2'-deoxy-uridine is dissolved in the acid or water in a relative amount of twice as much as the mol ratio of 2'-deoxy-uridine.

5. The process as claimed in claim 1, in which the relative amount of the cation exchange resin with respect to 2'-deoxy-uridine is equivalent to 2'-deoxy-uridine.

* * * * *